United States Patent [19]

Dotti et al.

[11] Patent Number: 4,531,707
[45] Date of Patent: Jul. 30, 1985

[54] PRESSURE CONTROL VALVE FOR AN OPEN HYDRAULIC CIRCUIT

[75] Inventors: Giulio Dotti, Milan; Luciano Moretti; Ugo Costelli, both of Turin, all of Italy

[73] Assignee: Centro Ricerche Fiat S.p.A., Turin, Italy

[21] Appl. No.: 225,375

[22] Filed: Jan. 15, 1981

[30] Foreign Application Priority Data

Jan. 23, 1980 [IT] Italy ............... 67092 A/80

[51] Int. Cl.³ ............................................. F16K 31/12
[52] U.S. Cl. ............................................. 251/44; 251/30
[58] Field of Search ..................... 251/30, 44, 45; 137/489, 115

[56] References Cited

U.S. PATENT DOCUMENTS

| | | | |
|---|---|---|---|
| 2,673,706 | 3/1954 | Matteson | 251/44 |
| 2,747,606 | 5/1956 | Adams et al. | 137/489 |
| 2,758,811 | 8/1956 | Peterson | 251/44 |
| 3,204,926 | 9/1965 | Wismar | 251/44 |
| 3,250,294 | 5/1966 | Hipple | 251/30 |
| 3,381,931 | 5/1968 | Boonshaft | 251/30 |
| 4,201,362 | 5/1980 | Nishimi et al. | 251/44 |

Primary Examiner—Alan Cohan
Assistant Examiner—John A. Rivell
Attorney, Agent, or Firm—Frost & Jacobs

[57] ABSTRACT

The valve is arranged to control the pressure of a hydraulic fluid by discharging a proportion of its flow, and comprises a mobile valve element arranged to control the opening of a discharge port of a first chamber and kept normally closed by the action of a spring, a piston element rigid with said valve element and arranged to define a second chamber which is in hydraulic communication with the first by way of a first bore of predetermined size, and a third chamber in hydraulic communication both with the preceding by way of a second bore also of predetermined size, and with the discharge outlet by way of a discharge port the opening of which is controlled by an interception member operated by an electromagnet; the pressure of said fluid is controlled by varying the discharge port controlled by said interception member and consequently the rate of a flow of control fluid passing through said first bore, second chamber, second bore and third chamber.

5 Claims, 2 Drawing Figures

PRESSURE CONTROL VALVE FOR AN OPEN HYDRAULIC CIRCUIT

BACKGROUND OF THE INVENTION

This invention relates to a pressure control valve for an open hydraulic circuit, in which the control action is provided by feeding to discharge a predetermined proportion of the flow of fluid fed to the valve.

Valves of this type comprise a mobile valve element arranged to open a discharge port in order to discharge said proportion of flow, its movement being controlled by a servomechanism controlled normally by an electromagnet.

This servomechanism, which is usually of hydraulic operation, acts as an actual amplifier in order to generate forces and/or movements which are sufficiently large to control said valve element, when much smaller forces and/or movements are applied to or induced in said servomechanism.

Because of the structure of said servomechanism, valves of the described type are constructionally rather complicated, of large overall size and sometimes of low reliability.

Furthermore, they have poor versatility of application because each valve can be used only for pressures lying within a well defined range.

SUMMARY OF THE INVENTION

The object of the present invention is to provide a pressure control valve for an open hydraulic circuit, which is constructionally very simple and of small overall size, and which has high reliability.

A further object of the invention is to provide a valve of this type which can be given considerable versatility of application for very wide pressure ranges by simply replacing one or more parts thereof.

A further object of the invention is to provide a valve of the said type which has high dynamic stability, and with which the pressure controlled thereby is hardly influenced by pressure variations in the feed fluid.

The invention provides a pressure control valve for an open hydraulic circuit, which, for a hydraulic fluid fed to a feed duct of the valve, is arranged to control its pressure upstream of said duct by feeding a proportion of its flow to discharge, characterised by comprising: a valve element mobile in the valve body and arranged to control the opening of a discharge port between a first chamber into which said duct opens and the discharge outlet, said valve element being kept normally closed by the action of a spring and being provided with first active surfaces arranged to sense the pressure acting in said first chamber in order to cause movement of said valve element; a piston element rigid with said valve element and arranged to define a second chamber in cooperation with surfaces of a cavity of said body, and to move inside said cavity, said piston element being provided with second active surfaces arranged to sense the pressure acting in said second chamber in order to cause movement of said valve element, and said first and second chamber being in hydraulic communication with each other by way of at least one first bore of predetermined size; a third chamber provided in said body and in communication with the discharge outlet by way of a port the opening of which is controlled by an interception member controlled by an electromagnet which operates the valve; said third chamber being in hydraulic communication with said second chamber by way of at least one second bore of predetermined size, in order to create through said first bore, second chamber, second bore and third chamber a flow of control fluid towards the discharge outlet; said pressure of said fluid in said feed duct being controlled, by means of said electromagnet, by varying the port controlled by said interception member and thus the rate of said flow of control fluid.

BRIEF DESCRIPTION OF THE DRAWINGS

The present invention will be more apparent from the description given hereinafter of one embodiment thereof with reference to the accompanying drawings in which.

DETAILED DESCRIPTION OF THE INVENTION

Figure 1:
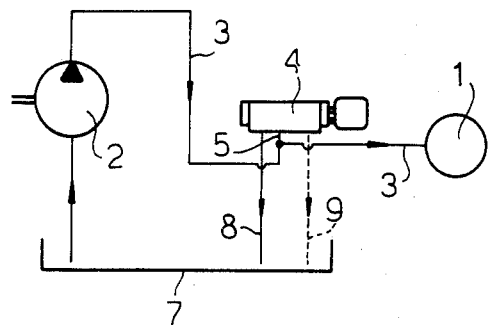
FIG. 1 represents a hydraulic circuit into which the valve according to the invention is connected.

The pressure control valve according to the invention is arranged for connection into an open hydraulic circuit of the type shown in FIG. 1, in order to control the pressure of a hydraulic fluid fed by a pump 2 to a user item 1 by way of a conduit 3. The valve according to the invention, indicated by 4, is connected to said conduit by means of a portion 5 thereof, which feeds fluid to the inlet 6 (FIG. 2) of the valve. Said fluid is then discharged from said valve, in the manner described hereinafter, to a tank 7 (FIG. 1) by way of conduits 8 and 9, which are connected respectively to the discharge outlets 10 and 11 (FIG. 2) of the valve.

Figure 2:
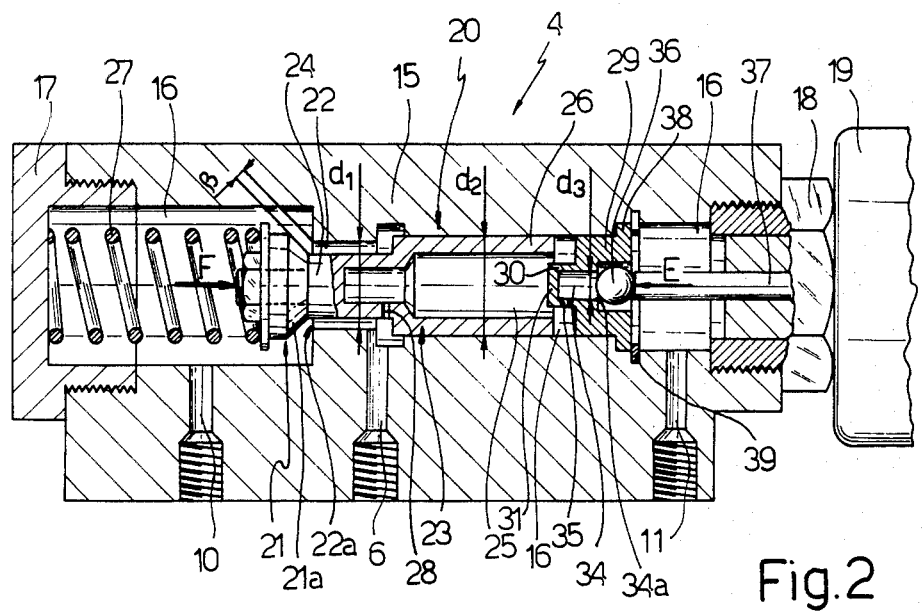
FIG. 2 is a longitudinal section through the valve in a general operating position.

The valve, shown in a general operating position in FIG. 2, comprises a body 15 provided with a cavity 16 comprising a number of portions bounded by cylindrical surfaces, and closed at one end by a plug 17 and at the other by a connection flange 18 for an electromagnet 19.

The valve also comrises a mobile member 20, mobile inside the cavity 16 and comprising a valve element 21 arranged to control the opening of a discharge port between a first chamber 22 (FIG. 2) and the discharge outlet 10. For this purpose the valve element 21 is provided with a conical surface 21a arranged to come into contact with a corresponding seat 22a of said chamber, into which the feed inlet 6 of the valve also opens.

The mobile member 20 also comprises a piston element 23 which is rigid by way of a stem 24 with said valve element and also mobile inside the cavity 16, and arranged to define with the surfaces of this latter a second chamber 25. Said piston element conveniently comprises a tubular side wall 26, the axis of which substantially coincides with that of the valve element 21. The first chamber 22 is put into hydraulic communication with the second chamber 25 by way of a first radial bore 28 provided in the side wall 26 of the piston element 23 and having a predetermined diameter. A spring 27, disposed between the plug 17 and the valve element 21, tends to keep this latter in the closed position (not shown) in which the conical surface 21a rests on the relative seat 22a in order to close the port towards the discharge outlet of the first chamber 22.

In the cavity 16 of the valve body at the other end of the piston element 23 to that from which the valve element 21 projects, there is disposed a bush 29 which is provided with a tubular side wall 30 and a base wall 31, and which defines internally a third chamber 34. This latter is in hydraulic communication with the second chamber 25 by way of a second radial bore 35 provided in the side wall 30. Said third chamber can also be connected to the discharge outlet 11 by way of an interception member, which in the embodiment illustrated is in the form of a ball 36, arranged to rest on a corresponding seat 34a of the chamber, its movement being controlled by a stem 37 of the electromagnet 19.

The bush 29 is fixed to the body 15 in any convenient manner, for example by means of a collar 38 formed thereon, which is arranged to rest on a corresponding shoulder of the body and is held against it by means of a split ring 39.

The valve operates in the following manner.

It will be assumed that the valve is in a general operating position such as that shown in FIG. 2, in which pressurised fluid reaches its inlet 6 and the electromagnet is activated such as to position the relative stem 37 in such a manner that it slightly opens the interception member (ball 36) of the third chamber 34 by a predetermined amount dependent on the pressure which is to be obtained at the inlet 6 (and thus in the conduit 3) (FIG. 1).

The fluid entering the inlet 6 fills the first chamber 22, from which it flows by way of the first bore 28 into the second chamber 25, and from this latter by way of the second bore 35 into the third chamber 34. Said fluid finally flows from this latter towards the discharge outlet 11 by way of the port uncovered by the wall 36, to thus give rise to a flow of control fluid between the inlet 6 and the discharge outlet 11 by way of the described path.

The fluid which fills the three said chambers applies, to the surfaces of the valve element 21 and piston element 23, pressures which have a resultant in the direction of the axis of the mobile member 20 which is other than zero, and which, as will be seen hereinafter, in the assumed case (discharge port for the third chamber 34 partially open) has a direction and absolute value such as to overcome the resilient reaction of the spring 27, in order to separate the surface 21a of the valve element 21 from the relative seat 22a and open the port of the first chamber 22 towards the discharge outlet 10. In said operating position, the mobile member 20 becomes disposed in an equilibrium position, such as that shown in FIG. 2, under the action of said resultant of the pressures applied to it and the force F exerted by the spiral spring 27, in which an opening is left free for the passage of a main flow of fluid towards the discharge outlet 10. The extent of this opening is indicated by $\beta$ in FIG. 2.

The fluid pressure which becomes established in the first chamber 22 (and thus in the inlet 6 and the conduits upstream thereof) depends on the flow rate of the fluid discharged from the said main flow, and on the extent of the opening $\beta$, which is controlled in the manner described hereinafter by the control flow and thus by the extent by which the third chamber 34 is opened towards discharge, this opening being dependent on the position of the ball 36.

When the valve is in a configuration such as that shown in FIG. 2, and the aforesaid main and control flows are established, the pressure $p_c$ of the fluid in the second chamber 25 is less than the pressure p in the first chamber 22, and the pressure $p_p$ in the third chamber 34 is less than $p_c$, because of the pressure drops arising in passing through the first and second bore 28 and 35 respectively. In this respect, if it is assumed that q is the control flow rate and that the fluid has a density $\rho$, $c_p$ and $c_c$ being the coefficient of reduction of the theoretical velocity and the coefficient of contraction of the fluid stream in said bores respectively, and $\sigma_1$ and $\sigma_2$ being the cross-sections through the bores 28 and 35 respectively, then with a good approximation:

$$p - p_c = \frac{1}{2} \cdot \frac{q^2}{\sigma_1^2} \cdot \frac{\rho}{c_p^2 c_c^2} \qquad (1)$$

$$p_c - p_p = \frac{1}{2} \cdot \frac{q^2}{\sigma_2^2} \cdot \frac{\rho}{c_p^2 c_c^2} \qquad (2)$$

from which, by division:

$$p - p_c = \left(\frac{\sigma_2}{\sigma_1}\right)^2 \cdot (p_c - p_p) \qquad (3)$$

In said general equilibrium configuration, the mobile member 20 is acted upon by the force F (FIG. 2) of resilient reaction of the spring and the forces generated on the mobile member by the pressures p and $p_c$, which if $S_1$ and $S_2$ ($S_2 > S_1$) indicate the surface area of the sections through the first and second chamber 22 and 25 (FIG. 2) (of diameters $d_1$ and $d_2$), are obviously equal to $p \cdot (S_2 - S_1)$ and $p_c \cdot S_2$. The equilibrium equation for the mobile member is therefore as follows:

$$F + p(S_2 - S_1) = p_c S_2 \qquad (4)$$

which can also be written in the form:

$$p = \frac{F}{S_1} + (p - p_c)\frac{S_2}{S_1} \qquad (5)$$

which, taking account of (1) and (2), easily becomes:

$$p = \frac{F}{S_1 - \eta S_2} - p_p \frac{\eta S_2}{S_1 - \eta S_2} \qquad (6)$$

where n is the non-dimensional ratio $$\eta = \frac{2^2}{1^2 + 2^2} \qquad (7)$$

which depends only on the cross-sections of the bores 28 and 35. From (6) it is therefore apparent that, in a valve with predetermined geometrical characteristics, the pressure p in the first chamber 22 (which is the pressure established by the valve in the circuit into which it is connected) decreases linearly as the pressure $p_p$ in the third chamber 34 increases, and thus decreases linearly with the closure of the discharge port of this latter, which is done by moving the ball 36 towards the relative seat 34a in the chamber. The minimum pressure p is therefore that which arises when said chamber is completely closed. Under these conditions the rate q of the control flow is zero, and in the second and third chamber 25 and 34 there is obviously the same pressure p, and thus this minimum value of the pressure p becomes:

$$p = F/S_1$$

which is obtained by making $p-p_c=0$, or $p_p=p$ in (5) and (6) respectively. In contrast, the maximum value of the pressure p is obtained when the discharge port in the third chamber 34 is completely open, to then give the minimum value of $p_p$. This maximum value tends towards $F/(S_1-\eta S_2)$ as $p_p$ tends towards 0. It is apparent that the value of $p_p$ depends only on the closure force E (FIG. 2) exerted on the ball 36 by the stem 37 of the electromagnet 19, and for the ball to be in equilibrium:

$$E=p_p\cdot S_3$$

where $S_3$ indicates the area of the cross-section through the third chamber 34 of diameter $d_3$ (FIG. 2).

From an examination of (6) it can also be seen that the variation of p with $p_p$ (and thus with the closure of the discharge port of the third chamber 34) is greater the larger the term:

$$\eta S_2/(S_1-\eta S_2)$$

which can therefore be considered as an amplification factor of the pressure $p_p$. Once the values of $S_1$ and $S_2$ have been predetermined, it depends only on the choice of the values of the areas $\sigma_1$ and $\sigma_2$ of the cross-sections through the bores 28 and 35.

It is therefore apparent that with the valve of the invention, the pressure p can be controlled continuously within a wide range of values, the lower and upper limits of which can, from the aforegoing, be considered to be respectively:

$$F/S_1 \text{ and } F/(S_1-\eta S_2)$$

Passage between the said limits is more rapid as $p_p$ varies, the more the said amplification factor $\eta S_2/(S_1-\eta S_2)$ increases.

It is therefore also apparent that each of the aforesaid limits to the range of pressures p in which the valve of the invention is able to operate can be varied easily and rapidly by replacing only one component of the valve. In this respect, the lower limit can be varied by replacing the spiral spring 27 with another spring of different rigidity (thus varying the ratio $F/S_1$), while the upper limit can be varied by replacing the bush 29 (thus varying the diameter of the second bore 35 and consequently the ratio $\eta S_2/(S_1-\eta S_2)$). Likewise a different amplification factor can be obtained by replacing said bush. It follows that the valve is suitable for considerable operational versatility.

It has also been found that with the valve of the invention, high dynamic stability is obtained, because of which it is possible to use a very simple control electromagnet (electromagnet 19) of the nondamped type, even if there are frequent and considerable flow pulsations in the fluid feed conduit (conduit 3 of FIG. 1). This dynamic stability derives from the high damping action exerted on the fluid as this is forced through the two bores 28 and 35, because of which the control flow entering the third chamber 34 is in no way influenced by any dynamic irregularities present in the fluid flow entering the valve inlet 6. This damping action depends both on the diameter and on the position of said bores.

For these reasons it is therefore preferable for the diameters of the bores 28 and 35 to be rather small, as far as is compatible with the circuit conditions for the fluid passing through the valve. It has been found that if this is used in a normal circuit of an earth moving machine, the diameters of said bores can lie between 0.5 mm and 1 mm.

The valve of the invention also represents a very integrated assembly between the operational part (valve element 21, first chamber 22) and the control part (piston element 23, second and third chamber 25 and 34), with the advantage of giving rise to a very compact structure of very small overall size.

It is apparent that modifications can be made to the described embodiment of the invention without leaving the scope of the inventive idea. In particular, the form of the various parts defining the three chambers 22, 25 and 34 can be different, as can the position of the bores 28 and 35 which connect the first chamber to the second and the second to the third respectively.

What we claim is:

1. A pressure control valve for use in an open hydraulic circuit which includes a source of fluid under pressure, a user device operated by the fluid under pressure, and a discharge, said control valve being positioned between said source of fluid under pressure and said user device, said pressure control valve comprising:

(a) a valve body having an essentially cylindrical cavity therein, an inlet opening in said cavity connected to the source of fluid under pressure and to said user device, and two outlet openings in said cavity communicating with said discharge;

(b) a mobile member slidable within said cavity, a substantially conical valve element at one end of said mobile member arranged to control the opening and closing of a discharge port in said cavity lying between said inlet opening and a first of said outlet openings; said mobile member subdividing said cavity to define a first chamber into which said inlet opening debouches, and a second chamber connected to said first chamber by means of a first bore of predetermined size, said second chamber being closed at one end by a bush, said bush defining a third chamber connected to said second chamber by means of a second bore of predetermined size, the second of said outlet openings being connected to said third chamber by way of a connection port;

(c) a spring adapted to normally urge said mobile member in a direction to close said discharge port and against the action of which said mobile member is slidable in a direction toward said first outlet opening;

(d) first and second active surfaces on said mobile member arranged to be responsive to the pressure acting in said first and second chambers, respectively, in order to cause axial movement of said valve element; and (e) interception means in said connecting port operative to control the opening of said port, said interception means being controlled by an electromagnet in response to the requirements of the user device, said interception means acting to meter in a continuous manner a continuous control flow of fluid from said inlet opening to said second outlet opening through said first, second and third chambers and said first and second bores, whereby to displace said mobile member in accordance with variations in the flow of control fluid through said second outlet orifice and hence control the flow of fluid through said first outlet orifice.

2. The pressure control valve claimed in claim 1 wherein said mobile member comprises a tubular side wall which defines said second chamber in cooperation with the cylindrical surface of the cavity in said valve body, said first bore being formed in the tubular side wall of said mobile member, the axis of said first bore being substantially orthogonal to the longitudinal axis of said tubular side wall.

3. The pressure control valve claimed in claim 1 wherein said third chamber is formed in said bush, the axis of said bush coinciding with the axis of said mobile member, said bush having a tubular side wall and a flat base wall, said second bore being formed in the side wall of said bush and having its axis substantially orthogonal to said bush axis.

4. The pressure control valve claimed in claim 3 wherein said interception means comprises a ball element arranged to rest on a seat defined by the tubular side wall of said bush, and a mobile actuating stem in contact with said ball, the movement of said actuating stem being controlled by said electromagnet.

5. The pressure control as claimed in claim 1 wherein said conical valve element is connected to said mobile member by a cylindrical stem, said first chamber being defined between the outer surface of said stem and the surrounding surface of the cylindrical cavity in said body.

* * * * *